US012737269B2

(12) United States Patent
Hendrickson et al.

(10) Patent No.: US 12,737,269 B2
(45) Date of Patent: Sep. 15, 2026

(54) FUNCTIONAL VERIFICATION USING TARGETED COMMANDS AND SIMULATED INTERACTION

(71) Applicant: INTERNATIONAL BUSINESS MACHINES CORPORATION, Armonk, NY (US)

(72) Inventors: Olaf Knute Hendrickson, Rochester, MN (US); Michael P. Mullen, Poughkeepsie, NY (US); Carsten Greiner, Holzgerlingen (DE); Monalisa Rout, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/765,767

(22) Filed: Jul. 8, 2024

(65) Prior Publication Data

US 2026/0010447 A1 Jan. 8, 2026

(51) Int. Cl.
*G06F 11/22* (2006.01)
*G06F 11/26* (2006.01)

(52) U.S. Cl.
CPC ........ *G06F 11/2236* (2013.01); *G06F 11/261* (2013.01)

(58) Field of Classification Search
CPC ............... G06F 11/2236; G06F 11/261; G06F 11/2242; G06F 11/273
See application file for complete search history.

(56) References Cited

U.S. PATENT DOCUMENTS 5,081,601 A * 1/1992 Eirikasson .............. G06F 8/458 703/17
6,006,028 A 12/1999 Aharon et al.
(Continued)

FOREIGN PATENT DOCUMENTS

CN 110674616 A 1/2020

OTHER PUBLICATIONS

D. G. Bair et al., "Functional verification of the z990 superscalar, multibook microprocessor complex," in IBM Journal of Research and Development, vol. 48, No. 3.4, pp. 347-365, May 2004, doi: 10.1147/rd.483.0347. (Year: 2004).*
(Continued)

*Primary Examiner* — Ashish Thomas
*Assistant Examiner* — Catherine Marie Nguyen
(74) *Attorney, Agent, or Firm* — Edward J. Wixted, III; Matthew M. Hulihan, Esq.; Heslin Rothenberg Farley & Mesiti P.C.

(57) ABSTRACT

Simulated interaction between processor hardware as part of processor functional verification includes, in an example, commencing a simulation in a simulation environment. The simulation executes a test case using a model of a processor core for functional verification of the processor core. It also includes monitoring progression of the simulation for a trigger condition for simulated interaction. Based on recognizing the trigger condition for simulated interaction at a point in the test case, it additionally includes changing an architected state of the model, where the changing directs the progression of the simulation, at the point in the test case, to simulate interaction between the processor core and another executing entity. Based on a determination to end the simulated interaction, it further includes continuing progression of the simulation from the point in the test case.

20 Claims, 6 Drawing Sheets

(56) References Cited

U.S. PATENT DOCUMENTS

| | | | | |
|---|---|---|---|---|
| 7,133,816 | B2 | 11/2006 | Adir et al. | |
| 9,251,023 | B2 | 2/2016 | Atherton et al. | |
| 9,734,033 | B2 | 8/2017 | Hendrickson et al. | |
| 9,996,439 | B2 | 6/2018 | Cheng et al. | |
| 10,061,672 | B2 | 8/2018 | Dagan et al. | |
| 10,936,769 | B2 | 3/2021 | Kintali et al. | |
| 11,106,602 | B2 | 8/2021 | Hendrickson et al. | |
| 11,443,044 | B2 | 9/2022 | Hendrickson et al. | |
| 11,599,098 | B2 | 3/2023 | Wentz et al. | |
| 2010/0011345 | A1 | 1/2010 | Hickerson et al. | |
| 2010/0223505 | A1 * | 9/2010 | Andreev | G06F 12/1027 714/E11.178 |
| 2011/0099431 | A1 | 4/2011 | Almog et al. | |
| 2020/0201778 | A1 * | 6/2020 | Ludden | G06F 12/08 |
| 2023/0195981 | A1 * | 6/2023 | Kapoor | G06F 12/0842 716/136 |

OTHER PUBLICATIONS

Controlling Execution Order of Unit Tests in Visual Studio, Stack Overflow, Apr. 2, 2023, stackoverflow.com/questions/20711300/controlling-execution-order-of-unit-tests-in-visual-studio. (Year: 2023).*

Tanenbaum, A. S., & Bos, H. J. (2015). Modern Operating Systems, 4th Edition. Pearson Higher Education. (Year: 2015).*

"Project 3: Demand Paging," University of California San Diego. Retrieved from Wayback Machine on May 10, 2021. (Year: 2021).*

Koo, H-M., et al., "Automated Micro-Architectural Test Generation for Validation of Modern Processors", Department of Computer and Information Science and Engineering University of Florida, 5 pgs.

Formica, F., et al., "Simulation-Based Testing of Simulink Models With Test Sequence and Test Assessment Blocks", arXiv:2212.11589v1 [cs.SE], Dec. 22, 2022, 12 pgs.

IBM, "Method and Apparatus for Verification of a Computer Against a Specified Architecture on a Hardware Simulator With an Arbitrary Random Testcase Generation Program", ip.com, IPCOM000193471D, Feb. 25, 2010, 4 pgs.

Authors Disclosed Without Attribution, "Test Generation for System Level Verification of Production Processes", ip.com, IPCOM000226533D, Apr. 14, 2013, 4 pgs.

Authors Disclosed Without Attribution, "Method for Verifying Intermediate Results of a Randomly Generated Testcase of Processor Functional Validation Exerciser", ip.com, IPCOM000243758D, Oct. 16, 2015, 10 pgs.

Bertacco, V., et al., "Stress Test: An Automatic Approach to Test Generation Via Activity Monitors", Research Gate, Conference Paper, Jan. 2005, 7 pgs.

Adir, A., et al., "Genesys-Pro: Innovations in Test Program Generation for Functional Processor Verification", Functional Verification and Testbench Generation, IBM Research Lab, Mar.-Apr. 2004, pp. 84-93.

C.A. Krygowski et al., "Key advances in the presilicon functional verification of the IBM zEnterprise microprocessor and storage hierarchy", IBM Journal of Research and Development, vol. 56, No. 1/2, Jan.-Mar. 2012, pp. 13:1-13:16.

* cited by examiner

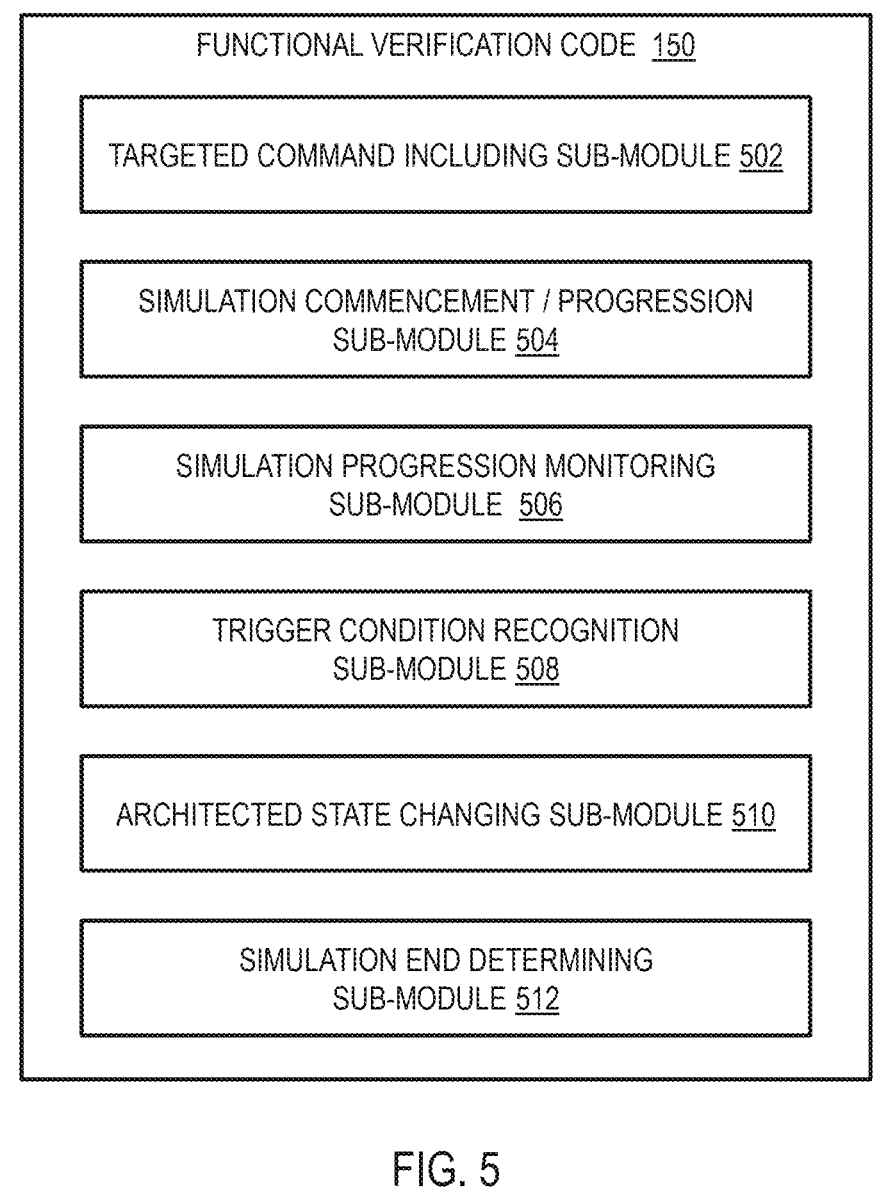

FUNCTIONAL VERIFICATION CODE 150

TARGETED COMMAND INCLUDING SUB-MODULE 502

SIMULATION COMMENCEMENT / PROGRESSION SUB-MODULE 504

SIMULATION PROGRESSION MONITORING SUB-MODULE 506

TRIGGER CONDITION RECOGNITION SUB-MODULE 508

ARCHITECTED STATE CHANGING SUB-MODULE 510

SIMULATION END DETERMINING SUB-MODULE 512

FIG. 5

FUNCTIONAL VERIFICATION USING TARGETED COMMANDS AND SIMULATED INTERACTION

BACKGROUND

The present application relates generally to improved data processing apparatuses and methods, and more specifically to facilities for verification of hardware, such as multi-threaded multi-processors and individual processing cores. Processor verification can help ensure equivalence between a processor and its architectural specification. Verification can be achieved either by a formal proof or by exhaustive simulation. However, the complexity of processors renders the formal approach impractical, and the size of the test space makes exhaustive simulation impractical.

SUMMARY

Shortcomings of the prior art are overcome and additional advantages are provided through the provision of a computer-implemented method. The method commences a simulation in a simulation environment. The simulation executes a test case using a model of a processor core for functional verification of the processor core. The method also monitors progression of the simulation for a trigger condition for simulated interaction. The method additionally, based on recognizing the trigger condition for simulated interaction at a point in the test case, changes an architected state of the model. The changing directs the progression of the simulation, at the point in the test case, to simulate interaction between the processor core and another executing entity. The method also, based on a determination to end the simulated interaction, continues progression of the simulation from the point in the test case.

Additional aspects of the present disclosure are directed to computer systems and computer program products to perform computer operations described above and herein. The present summary is not intended to illustrate each aspect of, every implementation of, and/or every embodiment of the present disclosure. Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

FIG. 5 depicts further details of example functional verification code to incorporate and/or use aspects described herein.

DETAILED DESCRIPTION

Figure 1:
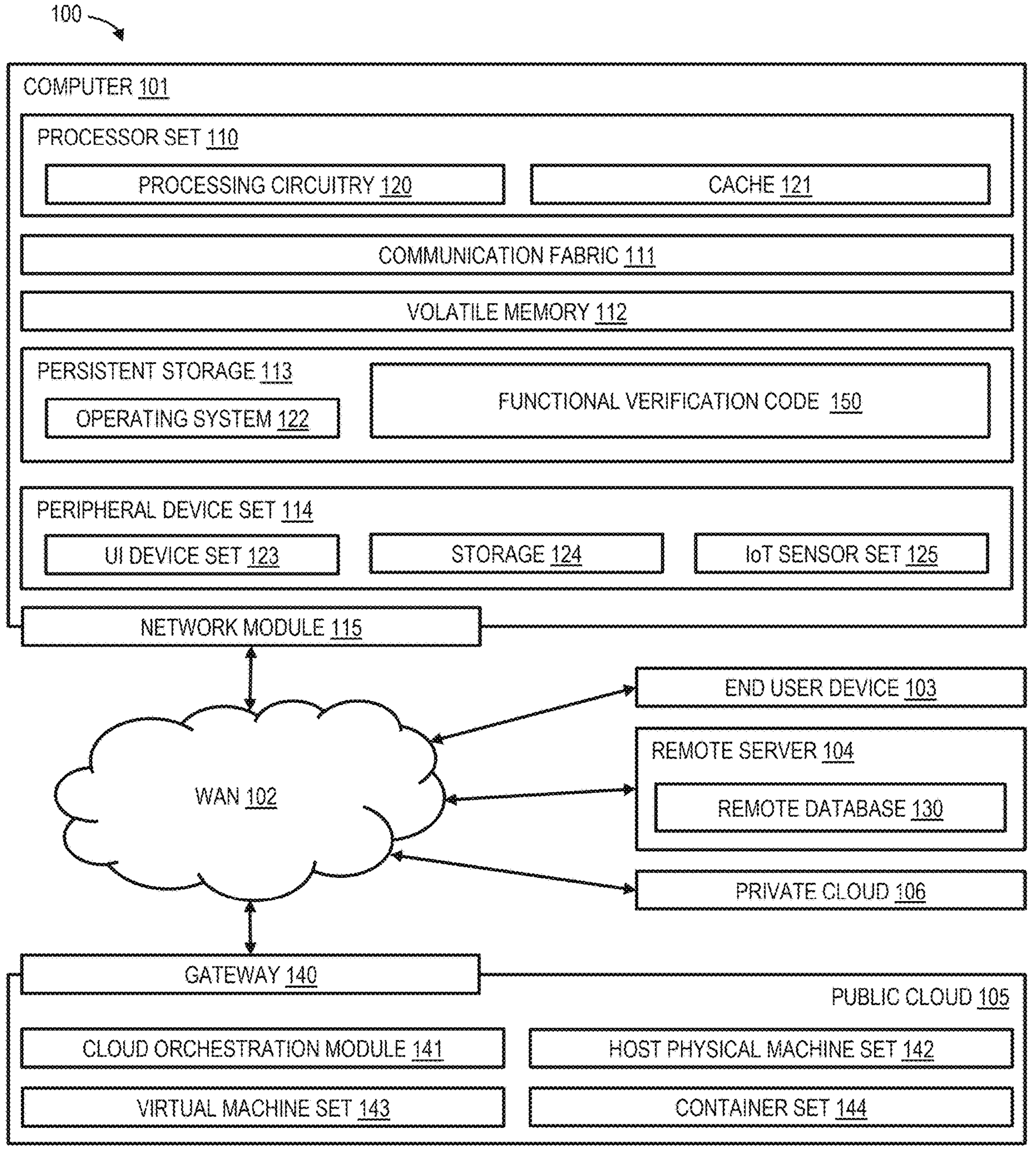
FIG. 1 depicts an example computing environment to incorporate and/or use aspects described herein.

Described herein are facilities for simulated interaction between processor hardware as part of processor functional verification, and based on placement of targeted commands by a test generator. According to an aspect of the invention, there is provided a computer-implemented method. The method includes commencing a simulation in a simulation environment, the simulation executing a test case using a model of a processor core for functional verification of the processor core. The method further includes monitoring progression of the simulation for a trigger condition for simulated interaction. Additionally, the method includes, based on recognizing the trigger condition for simulated interaction at a point in the test case, changing an architected state of the model, where the changing directs the progression of the simulation, at the point in the test case, to simulate interaction between the processor core and another executing entity. The method also includes, based on a determination to end the simulated interaction, continuing progression of the simulation from the point in the test case. Changing the architected state of the processor core model enables simulated interaction between the processor core under test and other hardware by way of the simulation environment. This avoids having to model and run the other hardware as part of the simulation, thus avoiding a larger model size and additional resource consumption that would otherwise result. This reduces resource demand and improves computational efficiency and speed in verification testing. Additionally, use of the simulation environment, as opposed to simulating instructions using a more complex hardware model, enables running of more simulation cycles using the resources allocated.

In embodiments, the trigger condition includes a state change condition that triggers the change in the architected state from an initial state to a changed state, where the architected state remains in the changed state for the simulated interaction. The method further includes monitoring the progression of the simulation for a state restore condition. The method also includes, based on recognizing the state restore condition, restoring the architected state to the initial state. Maintaining the architected state in the changed state for the simulated interaction has an effect of verifying processor core behavior across a desired number of simulation cycles as long as the simulated interaction continues. Monitoring for the state restore condition and restoring the architected state to the initial state enables the simulation to return to the state prior to the simulated interaction and continue with core verification as if the simulated interaction did not occur, thus helping to ensure that the simulated interaction does not adversely impact other aspects of the simulation or expected test results.

In embodiments, the changed state emulates a page fault exception, where changing the architected state to the changed state includes altering at least one bit value of the model. The altering invalidates a page table entry and drives the page fault exception based on execution of an instruction of the test case. This enables testing of interruptible operations/instructions through page faults, which is more accurate to practical hardware operation as compared to conventional verification testing to process page faults.

In embodiments, restoring the architected state to the initial state includes restoring the at least one bit value, the restoring the at least one bit value restoring the page table entry, and where the determination to end the simulated interaction includes a determination that the page table entry is restored. Restoring the page table entry enables a resume from the point where the exception was taken so that the simulation proceeds from that point as if no exception has been thrown, thus providing seamless testing of the interrupted instruction.

In embodiments, the method further includes identifying the point in the test case, the point being a point at which to emulate a page invalidation. The method also includes including in the test case a targeted command to change the architected state to emulate the page invalidation by altering the at least one bit value, and indications of the state change condition and state restore condition. Further, the commencing the simulation commences the simulation using the test case with the included targeted command and the indications of the state change condition and the state restore condition. Using a targeted command within the test case enables the simulated interaction to be provided as a built-in feature of a test generator that generates the test case for commencement of the simulation when desired. Including the indications of the state change condition and state restore condition enable specification of the specific triggers for starting and ending the simulated interaction, thus providing control over when to simulate the interaction. Additionally, it enables targeting specific micro-architecture alterations, for instance specific cache line invalidates in this example, with desired, precise timing or random timing, as desired.

In embodiments, the method also includes including in the test case a program interrupt handler to iteratively retry execution of the instruction of the test case, based on the page table entry being invalidated. This ensures the simulation returns to the instruction that raised the exception and continues with the simulated interaction as long as desired, and until the desired state restore condition is reached, while avoiding having to provide interrupt handling as part of the instructions of the test case itself.

In embodiments, the changed architecture state emulates a changed instruction stream of the test case, where changing the architected state to the changed state includes replacing an instruction of the test case, at the point in the test case, with a changed instruction that directs the progression of the simulation to a subroutine. This enables simulating a concurrent modification of the instruction stream scenario with direction to a desired subroutine without actual modification by another entity being simulated.

In embodiments, restoring the architected state to the initial state includes restoring the instruction of the test case, where the determination to end the simulated interaction includes a determination that the instruction of the test case is restored. Restoring the instruction enables a resume from the original instruction (which was simulated to be modified), so that the simulation proceeds from that point as if no modification had occurred, thus providing seamless testing of the simulated-modified instruction.

In embodiments, the method further includes identifying the point in the test case, the point being a point at which to emulate a modification to the instruction stream of the test case. The method further includes including in the test case a targeted command to change the architected state to emulate the modification to the instruction stream to call the subroutine, and indications of the state change condition and state restore condition. The commencing the simulation commences the simulation using the test case with the included targeted command and the indications of the state change condition and the state restore condition. Using a targeted command within the test case enables the simulated interaction to be provided as a built-in feature of a test generator that generates the test case for commencement of the simulation when desired. Including the indications of the state change condition and state restore condition enable specification of the specific triggers for starting and ending the simulated interaction, thus providing control over when to simulate the interaction. Additionally, it enables targeting specific micro-architecture alterations, for instance specific modifications to the instruction stream, with desired, precise timing or random timing, as desired.

In embodiments, the changed state emulates sharing of data by the another executing entity, where changing the architected state to the changed state includes storing a value to the model, where the storing emulates an indication that the data has been shared by the another executing entity and directs the progression of the simulation to proceed as if the data were shared by another thread or processor core. This enables shared storage interaction from the other entity, such as a thread or core, without having to model and run the other entity as part of the simulation, thus reducing resource demand and improving computational efficiency and speed in verification testing. In embodiments, the determination to end the simulated interaction includes a determination that the value has been restored. This enables simulating scenarios in which the other entity restores a value for the core under test.

In embodiments, changing the architected state performs the change under a quiesce sequence issued by the simulation environment based on inclusion of a targeted command in the test case. This enables the simulated interaction to conform to shared resource rules for hardware, thereby enabling seamless insertion of the simulated interaction into test cases without having to account for simulated interaction scenarios as part of the test case.

In embodiments, the method further includes performing a cleanup to cleanup one or more traces of the simulated interaction. Cleanup of artifacts or other results of the simulation that resulted from the simulated interaction can erase or mask indications of the simulated interaction. This enables simulation-injected events/interaction into an original test case, while yielding predictable and recognizable final results based on the original test case and expected results thereof as if the simulated interaction were not injected.

In embodiments, the simulated interaction is one simulated interaction of a plurality of simulated interactions, where the method further includes generating the test case. The generating includes including in the test case a plurality of targeted commands in a selected order to change the architected state and drive the plurality of simulated interactions in the selected order, the selected order resulting in serial performance of the plurality of simulated interactions as part of the simulation. This enables ordering of interactions and controlled starting and ending thereof, including enforcement of complex sequences of interactions and chains of events, without reliance on random or by-chance interactions.

In embodiments, a computer system is provided. The computer system includes at least one computing device. The computer system also includes a set of one or more computer readable storage media. The computer system further includes program instructions, collectively stored in the set of one or more computer readable storage media, for causing the at least one computing device to perform computer operations. The computer operations include commencing a simulation in a simulation environment, the simulation executing a test case using a model of a processor core for functional verification of the processor core. The computer operations further include monitoring progression of the simulation for a trigger condition for simulated interaction. Additionally, the computer operations include, based on recognizing the trigger condition for simulated interaction at a point in the test case, changing an architected state of the model, where the changing directs the progression of the simulation, at the point in the test case, to simulate interaction between the processor core and another executing entity. The computer operations also include, based on a determination to end the simulated interaction, continuing progression of the simulation from the point in the test case. Changing the architected state of the processor core model enables simulated interaction between the processor core under test and other hardware by way of the simulation environment. This avoids having to model and run the other hardware as part of the simulation, thus avoiding a larger model size and additional resource consumption that would otherwise result. This reduces resource demand and improves computational efficiency and speed in verification testing. Additionally, use of the simulation environment, as opposed to simulating instructions using a more complex hardware model, enables running of more simulation cycles.

In embodiments of an example computer system, the trigger condition includes a state change condition that triggers the change in the architected state from an initial state to a changed state, where the architected state remains in the changed state for the simulated interaction. Additionally, the computer operations further include monitoring the progression of the simulation for a state restore condition. Further, the computer operations further include, based on recognizing the state restore condition, restoring the architected state to the initial state. Maintaining the architected state in the changed state for the simulated interaction has an effect of verifying processor core behavior across a desired number of simulation cycles as long as the simulated interaction continues. Monitoring for the state restore condition and restoring the architected state to the initial state enables the simulation to return to the state prior to the simulated interaction and continue with core verification as if the simulated interaction did not occur, thus helping to ensure that the simulated interaction does not adversely impact other aspects of the simulation or expected test results.

In embodiments of an example computer system, the changed state emulates a page fault exception, where changing the architected state to the changed state includes altering at least one bit value of the model. The altering invalidates a page table entry and drives the page fault exception based on execution of an instruction of the test case. Restoring the architected state to the initial state includes restoring the at least one bit value, the restoring the at least one bit value restoring the page table entry, and where the determination to end the simulated interaction includes a determination that the page table entry is restored. The computer operations further include identifying the point in the test case, the point being a point at which to emulate a page invalidation. The computer operations also include including in the test case a targeted command to change the architected state to emulate the page invalidation by altering the at least one bit value. The computer operations further include including indications of the state change condition and state restore condition. The commencing the simulation commences the simulation using the test case with the included targeted command and the indications of the state change condition and the state restore condition. Further, the computer operations include including in the test case a program interrupt handler to iteratively retry execution of the instruction of the test case, based on the page table entry being invalidated. Emulating the page fault exception enables testing of interruptible operations/instructions through page faults, which is more accurate to practical hardware operation as compared to conventional verification testing to process page faults. Restoring the page table entry enables a resume from the point where the exception was taken so that the simulation proceeds from that point as if no exception has been thrown, thus providing seamless testing of the interrupted instruction. Using a targeted command within the test case enables the simulated interaction to be provided as a built-in feature of a test generator that generates the test case for commencement of the simulation when desired. Including the indications of the state change condition and state restore condition enable specification of the specific triggers for starting and ending the simulated interaction, thus providing control over when to simulate the interaction. Additionally, it enables targeting specific micro-architecture alterations, for instance specific cache line invalidates in this example, with desired, precise timing or random timing, as desired. Including the program interrupt handler ensures the simulation returns to the instruction that raised the exception and continues with the simulated interaction as long as desired, and until the desired state restore condition is reached, while avoiding having to provide interrupt handling as part of the instructions of the test case itself.

In embodiments, a computer program product is provided. The computer program product includes a set of one or more computer readable storage media. The computer program product also includes program instructions, collectively stored in the set of one or more computer readable storage media, for causing at least one computing device to perform computer operations. The computer operations include commencing a simulation in a simulation environment, the simulation executing a test case using a model of a processor core for functional verification of the processor core. The computer operations further include monitoring progression of the simulation for a trigger condition for simulated interaction. Additionally, the computer operations include, based on recognizing the trigger condition for simulated interaction at a point in the test case, changing an architected state of the model, where the changing directs the progression of the simulation, at the point in the test case, to simulate interaction between the processor core and another executing entity. The computer operations also include, based on a determination to end the simulated interaction, continuing progression of the simulation from the point in the test case. Changing the architected state of the processor core model enables simulated interaction between the processor core under test and other hardware by way of the simulation environment. This avoids having to model and run the other hardware as part of the simulation, thus avoiding a larger model size and additional resource consumption that would otherwise result. This reduces resource demand and improves computational efficiency and speed in verification testing. Additionally, use of the simulation environment, as opposed to simulating instructions using a more complex hardware model, enables running of more simulation cycles.

In embodiments of an example computer program product, the trigger condition includes a state change condition that triggers the change in the architected state from an initial state to a changed state, where the architected state remains in the changed state for the simulated interaction. Additionally, the computer operations further include monitoring the progression of the simulation for a state restore condition. Further, the computer operations further include, based on recognizing the state restore condition, restoring the architected state to the initial state. Maintaining the architected state in the changed state for the simulated interaction has an effect of verifying processor core behavior across a desired number of simulation cycles as long as the simulated interaction continues. Monitoring for the state restore condition and restoring the architected state to the initial state enables the simulation to return to the state prior to the simulated interaction and continue with core verification as if the simulated interaction did not occur, thus helping to ensure that the simulated interaction does not adversely impact other aspects of the simulation or expected test results.

In embodiments of an example computer program product, the changed state emulates a page fault exception, where changing the architected state to the changed state includes altering at least one bit value of the model. The altering invalidates a page table entry and drives the page fault exception based on execution of an instruction of the test case. Restoring the architected state to the initial state includes restoring the at least one bit value, the restoring the at least one bit value restoring the page table entry, and where the determination to end the simulated interaction includes a determination that the page table entry is restored. The computer operations further include identifying the point in the test case, the point being a point at which to emulate a page invalidation. The computer operations also include including in the test case a targeted command to change the architected state to emulate the page invalidation by altering the at least one bit value. The computer operations further include including indications of the state change condition and state restore condition. The commencing the simulation commences the simulation using the test case with the included targeted command and the indications of the state change condition and the state restore condition. Further, the computer operations include including in the test case a program interrupt handler to iteratively retry execution of the instruction of the test case, based on the page table entry being invalidated. Emulating the page fault exception enables testing of interruptible operations/instructions through page faults, which is more accurate to practical hardware operation as compared to conventional verification testing to process page faults. Restoring the page table entry enables a resume from the point where the exception was taken so that the simulation proceeds from that point as if no exception has been thrown, thus providing seamless testing of the interrupted instruction. Using a targeted command within the test case enables the simulated interaction to be provided as a built-in feature of a test generator that generates the test case for commencement of the simulation when desired. Including the indications of the state change condition and state restore condition enable specification of the specific triggers for starting and ending the simulated interaction, thus providing control over when to simulate the interaction. Additionally, it enables targeting specific micro-architecture alterations, for instance specific cache line invalidates in this example, with desired, precise timing or random timing, as desired. Including the program interrupt handler ensures the simulation returns to the instruction that raised the exception and continues with the simulated interaction as long as desired, and until the desired state restore condition is reached, while avoiding having to provide interrupt handling as part of the instructions of the test case itself.

An additional embodiment of a computer-implemented method is provided. The method includes commencing a simulation in a simulation environment, the simulation executing a test case using a model of a processor core for functional verification of the processor core. The method further includes monitoring progression of the simulation for a trigger condition for simulated interaction. Additionally, the method includes, based on recognizing the trigger condition, e.g. state change condition, for simulated interaction at a point in the test case, changing an architected state of the model, where the changing directs the progression of the simulation, at the point in the test case, to simulate interaction between the processor core and another executing entity. The trigger condition includes a state change condition that triggers the change in the architected state from an initial state to a changed state. The architected state remains in the changed state for the simulated interaction. The changed state emulates a page fault exception, and changing the architected state to the changed state includes altering at least one bit value of the model. The altering invalidates a page table entry and drives the page fault exception based on execution of an instruction of the test case. Additionally, changing the architected state performs the change under a quiesce sequence issued by the simulation environment based on inclusion of a targeted command in the test case. The method further includes monitoring the progression of the simulation for a state restore condition. The method also includes, based on recognizing the state restore condition, restoring the architected state to the initial state. The method additionally includes, based on a determination to end the simulated interaction, continuing progression of the simulation from the point in the test case. Performing the state change from the initial state to the changed state under a quiesce in a page table entry invalidation scenario advantageously enables the simulated interaction to conform to rules for shared memory access for processor cores when accessing or modifying (in this case invalidating) cached data, for instance page table entries.

Further, in embodiments, the restoring the architected state to the initial state in the page table entry invalidation scenario includes restoring the at least one bit value, the restoring the at least one bit value restoring the page table entry, and the determination to end the simulated interaction comprises a determination that the page table entry is restored. Changing the architected state to restore to the initial state performs the change under a quiesce sequence issued by the simulation environment based on inclusion of a targeted command in the test case. Performing the state change from the changed state to the initial state under a quiesce in a page table entry invalidation scenario advantageously enables the simulated interaction to conform to rules for shared memory access for processor cores when accessing of modifying (in this case restoring) cached data, for instance page table entries.

A further embodiment of a computer-implemented method is provided. The method includes commencing a simulation in a simulation environment, the simulation executing a test case using a model of a processor core for functional verification of the processor core. The method further includes monitoring progression of the simulation for a trigger condition for simulated interaction. Additionally, the method includes, based on recognizing the trigger condition, e.g. state change condition, for simulated interaction at a point in the test case, changing an architected state of the model, where the changing directs the progression of the simulation, at the point in the test case, to simulate interaction between the processor core and another executing entity. The trigger condition includes a state change condition that triggers the change in the architected state from an initial state to a changed state. The architected state remains in the changed state for the simulated interaction. The changed state emulates a page fault exception, and changing the architected state to the changed state includes altering at least one bit value of the model. The altering invalidates a page table entry and drives the page fault exception based on execution of an instruction of the test case. The method further includes identifying the point in the test case, the point being a point at which to emulate a page invalidation. The method also includes including in the test case a targeted command to change the architected state to emulate the page invalidation by altering the at least one bit value, and indications of the state change condition and state restore condition. Further, the commencing the simulation commences the simulation using the test case with the included targeted command and the indications of the state change condition and the state restore condition. The method also includes including in the test case a program interrupt handler to iteratively retry execution of the instruction of the test case, based on the page table entry being invalidated. The method also includes, based on a determination to end the simulated interaction, continuing progression of the simulation from the point in the test case. The method additionally includes performing a cleanup to cleanup one or more traces of the simulated interaction. Including the handler and performing the cleanup in this situation advantageously enables the included program interrupt handler to drive the desired delay by way of iterating back to the faulting instruction, while providing a way for the presence of the included program interrupt handler, and artifacts of handler processing, to be masked or erased so as to yield predictable and recognizable final results based on the original test case and expected results thereof as if the exception were not injected.

Various embodiments described above and elsewhere herein may be separable and optional from each other.

One or more embodiments described herein may be incorporated in, performed by and/or used by a computing environment, such as computing environment 100 of FIG. 1. As examples, a computing environment may be of various architecture(s) and of various type(s), including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing process(es) that perform any combination of one or more aspects described herein. Therefore, aspects described and claimed herein are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as functional verification code 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication Fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Cloud Computing Services and/or Microservices (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The computing environment described above in FIG. 1 is only one example of a computing environment to incorporate, perform, and/or use aspect(s) of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

As noted, processor verification (including verification of processor cores individually or collectively) can help ensure equivalence between a processor and its architectural specification. Typically, an architecture specification is an informal description of the processor's resources, the instruction repertoire, and the effect of instruction execution on the processor state. It also describes the main hardware mechanisms such as address translation, interrupt handling, or multi-tasking.

In practice, design verification of hardware processors can be carried out by simulating the operation of sets of assembly-level test programs using a hardware simulator with a particular set of design parameters, and comparing the results with the output predicted by a behavioral simulator. The hardware simulator provides a simulation environment and may take as input a design model of hardware, the hardware model being written in a hardware description language, such as the standard VHDL (Very High Speed Integrated Circuit Hardware Description Language). The test programs are also referred to as test cases, and include one or more sets of ordered instructions as an instruction stream. Test cases are often generated by test program generators, though they could be wholly or partly generated from manual input. Some functional verification processes can operate on models that model multi-processors, for instance ones with multiple processor cores, each capable of executing multiple threads (multi-threading).

A simulation may be conducted in a simulation environment. A simulation controller or other component can load a test case, which could include initial memory states and other information/definitions in addition to the instruction stream(s), into a simulation model, such as a VHDL model, and begin clocking a simulator to instantiate components, such as thread(s) on core(s), to execute their respectively assigned code. The simulation controller (or other component) may monitor the progression of the simulation through the test case and may detect design bugs, such as hang conditions, control logic problems, or the like, which result in a machine check condition, using built-in error detection in the hardware and/or check for other design bugs, such as micro-architectural rule violations, correctness of architectural results, or the like, against the predicted results of the test case typically on an instruction-by-instruction basis as is done for single threaded designs using code that runs in simulation of the design. The simulation controller can then return test results, for instance to the user.

Verification in multi-threaded and/or multiple processor core scenarios presents challenges, including balancing the length of instruction streams, achieving a desired cross-thread and/or cross-core interaction, and efficient test generation. Creating and managing multiple instruction streams independent of one another can be difficult, and thread or core synchronization by way of synchronization routines inserted into the test can consume allocated resources (e.g., time, compute) on synchronization routines instead of performance of the body of the test. This in turn reduces the probability of finding design bugs. For instance, lining up instructions on one thread relative to instructions on another thread can lead to spending an undesirable amount of time in lining-up the instructions instead of the body of the test, and therefore reduce the probability of finding design bugs. Under normal circumstances, for each additional thread that is part of the verification process, the time required to generate an efficient test increases at least linearly. So, if a multi-threading test is being run on a simulator or real hardware, where the overhead of simulating additional threads does not increase at least linearly, then the time spent generating the test is growing faster (possibly significantly faster) than the simulation time. The net result is that test generation can become a bottleneck to the verification process.

As described above, random two-thread test generation can be expensive. It is not uncommon in some conventional approaches to use about 60% of allotted processing time on test generation and about 40% on the simulation itself, in which the model is run in the simulation environment. While it may be possible to reallocate resources, such as processor time, from the test generation phase to the simulation phase, this may be undesirable.

Meanwhile, depending on the hardware being modeled, the resulting model can be of varying complexity and size. Some processor cores are modeled by an extremely large model, for example. When emulating actions/processing using such a model in a functional verification environment, it may only be possible or practical to simulate that single processor core, rather than both the processor core and additional hardware, such as another processor core. In other words, the main verification model may be so large as to be prohibitive of verifying desired functionality in multiple-core scenarios where both cores are modeled. For example, functional verification might not be possible using two models (one for each of two cores) or a single model that models both cores because it may be prohibitively slow owing to the size of the model(s) involved.

Thus, modeling two threads and testing interaction between them, for instance the sharing of resources, can be done, though it is easier to do when the threads execute on a same processor core. Testing interaction when threads execute on different cores can be problematic for the reasons discussed above. Yet, it might be desired to test interaction between the two entities, for instance interaction between one thread executing on one core and another thread executing on the other core. As one example, the logic for sharing storage between two cores (as opposed to between two threads executing on a common core) may be different. In an example scenario that was explored, functionality that worked when sharing storage between two threads on a same core was found to be a problem only after simulating the interaction to share storage between two core models, i.e., threads on different cores. In other words, the problem presented itself only when simulating using a two-core model, and did not present itself when simulating the same interaction between two threads on the same core.

Other aspects drive an increasing desire for functional verification of cross-core interaction. For instance, there are more, and relatively complicated, interruptible operations for which functional verification is desired, which includes functionality around interruptions based on activity of other entities (e.g., cores). Neural network processing, deflate, and encryption functions are examples of such operations that are designed to be interruptible. Additionally, there are shared storage scenarios involving interactions between threads that were conventionally tested between threads on a single core but common practical situations in production systems often involve shared storage interactions between different cores.

Even in situations where the two interacting entities are modeled and run in the simulation, other challenges exist. Some conventional methods involve providing detailed instructions to a simulation environment, but this is either a manual task if targeted or fully random if not targeted. For instance, one existing method of testing a long operation with a page fault and attempt at recovery to finish the operation is tedious, with significant manual biasing in the test generator.

In addition, successfully getting two threads to collide by way of independent instructions streams when attempting to share the same resource can be difficult using random assembly level test cases. Cache and quiesce stimulation from the simulation environment can be extremely random in both timing and addressing. Very precise requirements may need to be followed to place a cache invalidate (as one example) at the right time and target to recreate in simulation. Better approaches are needed for targeting interactions in which both threads reference the same resource at the same time to cause a collision.

Many test objectives require targeted long delays, for instance to cause speculation to occur for verifying speculative processing functionality. Some approaches that rely on cache-line invalidation work only once in simulation without a targeted and periodic cache-line invalidate (as examples), since, after the exception is thrown, the system provides the cache hit and the instruction processing proceeds. Approaches that spin both threads in a loop to increase the chances of collision do not work with targeted delay.

One current method of providing external stimuli to the simulation model sees the simulation environment, which may be or include what is referred to as a 'driver', using random parameters, however this does not allow ordering of those events and operates without knowledge of the internal details of the test. Test generation can provide some direction, via random parameters, to apply stimuli in a random attempt to drive collision, but this lacks focus as to what exactly is to be 'hit'.

In accordance with some embodiments described herein, test generation with detailed knowledge of what is being tested is tied to the simulation environment to provide injection of simulation-injected events into the simulation model in a targeted manner. This can be leveraged to simulate interactions, such as stores, as if they were initiated from another entity, such as another processor core. It also enables ordering of the simulated interactions of varying scenarios to create a chain of events with a desired order.

In embodiments, test generation provides information for the simulation environment to alter an architected state of the hardware model, for example architected storage values in the model, instructions provided, and/or other aspects of the architected state during simulation. In an example embodiment, a test (also referred to as a 'test case' or 'test program') is generated as if there will be no interference with the architected state of the hardware model. A process may be built into the test generation environment to provide random (automatic) and/or directed (manual) simulation-injected events to simulate interaction between entities, for instance between two or more processors cores, which includes interaction between threads executing on respective cores of the two or more processing cores. In one example, interaction between one thread executing on one processor core and another thread executing on another processor core is simulated, despite the other processor core not being modeled as part of the model being simulated. In embodiments, the simulation environment alters the architected state of the hardware model to change the path of simulation. Changing of the architected state can therefore direct the progression of the simulation at some point in the test case to simulate the interaction between the two entities. In some embodiments, the simulation results provided at the end of the simulation could be presented to mirror what the results could have been as if the architected state alteration had never occurred. In some examples, aspects can be used as a general purpose tool to clean up unpredictable memory results in simulation before end of test checking, for instance.

As described herein, aspects can provide targeted commands in test cases for core functional simulation. Embodiments can be used to avoid reallocation of testing resources from test generation to simulation, yet result in significant increase in cycles of simulation to simulate interaction between two entities, and without having to run two separate instruction streams together (one for each entity). In accordance with some aspects, the architected state of the test is altered/changed while the simulation is running and after cycles of simulation have progressed (i.e., beyond the initial state of the simulation).

In embodiments, the test generator can automatically give directions to the simulation environment to apply stimuli without manual intervention from test definition writers, for instance. The simulation environment can receive targeted instructions on how, where, and when to apply cache commands and quiesce operations, for instance. Further, the simulation environment can act in a manner than simulates interaction by another core to alter architected results (store to memory) using proper core interface protocols and at controlled times.

A test generator, such as a constrained random test generator, is leveraged in some embodiments to perform aspects of an example process for simulated interaction in functional verification of hardware, in accordance with aspects described herein. The test generator generates instructions for inclusion in the test case for testing a processor core. In the example process, the test generator generates an instruction, for instance a single assembly level instruction, that goes into the instruction stream and that uses a resource that may be shared with another entity, for instance another processor core, at some point in time. One example of such a resource is a page table, which can include entries that may be subject to change or invalidation based on actions of another entity and therefore is a resource that is subject to shared storage interaction. For instance, another entity might engage in activity that causes an invalidation of a page table entry. This could result in a fault when the instruction, in the test case, that uses this resource attempts to use the page table entry by referencing the associated page. The process can also ascertain a specific resource to be used in executing the instruction. In the case of page table use, the process can ascertain a specific page table that is to be referenced when executing the instruction. Such recognition can be done using any appropriate facility. In some examples, the process uses built-in features, for instance a maintained history of page table accesses as one example, to extract an address of a page table expected to used in executing the instruction.

As part of test generation, the generation of the instruction and recognition of the shared resource provides a setup for simulating interaction that could occur at a point in testing. In the case of a page table entry invalidation, this causes a thread on the core being simulated to have some level of reliance on a shared resource that could give rise to a conflict, for instance if another core, which is not being simulated, accesses the resource or otherwise interacts in a way that affects the simulated core's access to the resource and ability to progress through the testing.

Recognizing the opportunity for simulated interaction based on the instruction, the process prints a targeted command to the test case with detailed information about changing the architected state based on trigger condition(s). The targeted command may be a command to the simulation environment, for instance a driver as one example, to drive targeted action as that point in the test case, and as described herein. In specific examples, the commands are commands to a driver for functional verification of nest accelerator hardware.

The injection of the targeted command into the test case and subsequent processing based thereon as described herein enables the simulation to simulate interaction with another entity, for instance another thread of another processor core, without having to model the other entity and generate/execute an instruction stream for the another thread to interact with the core/thread under test. The targeted command may direct the driver to generate stimuli that is directly related to the generated instruction of the test case. In the example of an instruction that involves a lookup for a page translation, this lookup uses a resource (e.g., memory) that could be subject to shared storage interaction, and therefore presents an opportunity for an injected targeted command to, during simulation, invoke processing that simulates interaction by another entity to potentially change that store, for instance to invalidate a translation. Instead of modeling that other entity, the driver can simulate the interaction (e.g., invalidation) by performing the targeted command.

By using targeted command(s), reliance on random interaction and the problems around random interaction may be avoided. Meanwhile, the targeted commands can be such that the objectives and outcome scenarios of the test case are unaffected. For instance, if the intent of the test case is to test given core functionality that is unrelated to shared resource interaction, simulated interaction as described herein could be injected to test such functionality even in situations of shared resource interactions without needing to specifically design the test to target those interactions.

In accordance with the above, the process identifies a point in the test, for instance a point at which an instruction is to be executed and that uses a shared resource, at which to simulate interaction between the core under test and another executing entity, such as another thread executing on another core that is not modeled as part of the simulation. The process includes in the test case a targeted command to change the architected state to simulate the interaction. This may be done by, for instance, altering at least one bit value of the model. In the case of a page invalidation, this could be accomplished by altering a bit to indicate the change in the shared resource, for instance that the page holding a translation is no longer valid. The change in architected state emulates a scenario where an actor, such as another processor core that runs a hypervisor, issues an instruction to invalidate a page table entry (IPTE) to perform such invalidation.

In embodiments, the process also includes in the test case indications of a state change condition as a trigger for changing the architected state from an initial state, and a state restore condition as a trigger for again changing the architected state, for instance to restore the architected state back to the initial state from its changed state, as explained in further detail herein.

It is noted that the aspects of generating an instruction, the execution of which uses a shared resource, and printing a targeted command to the test case for simulated interaction, can be repeated one or more times for the same or other simulated interaction between the entity under test and other entities, whether the same or different from each other. In this manner same or different interactions between the entity under test and varying other entities is possible.

To this point in the example process, the test case has not been finalized, and thus simulation to execute the test case has not yet begun. Once the test case has been generated and simulation is to commence, standard memory mapping/initial memory state setting can be performed and the simulation can be commenced. In an example scenario, the VHDL of the model and the simulation environment are compiled into a program for execution. Running the test case proceeds through the instruction stream, with the model and the simulation environment proceeding, typically, with one cycle of the model (to execute a test instruction, for instance), then one cycle of the simulation environment (e.g., driver) to collect and analyze results, and inject stimuli as appropriate. Commencing the simulation in the context of aspects described herein runs the test case in the simulation environment, and the simulation executes the test case using the model of the entity (a processor core) for functional verification of the entity (processor core). This commences the simulation using the test case with the included targeted command (or commands if more than one is included) and the indications of trigger condition(s), for instance the state change condition and the state restore condition as noted above, if using. The simulation environment by way of the driver recognizes the targeted command(s) to perform aspects described herein.

Thus, a process monitors progression of the simulation for a trigger condition for simulated interaction. In the case of a page table entry invalidation emulation, the trigger might cause a change the architected state of the model to emulate the page table entry invalidation. Any appropriate trigger conditions could be used.

One example type of trigger condition is based on time. For instance, a state change trigger condition could be to trigger the state change after a given number of cycles, say 1,000 cycles. Similarly, a state restore trigger condition could be to perform the state restore after a given number of cycles, which could be the same or a different number of cycles.

Another example type of trigger condition is more targeted around a specific instruction. For instance, it could wait for an instruction to finish execution as the test case expects, then trigger the state change, causing progression of the simulation to return to execute that instruction again and simulate a desired collision based on the state change, and therefore a problem that the instruction has to deal with. Eventually, the state can be restored (to indicate execution as the test case expected-prior to the simulated interaction) and the simulation can progress from there as it was originally designed in the test case and expected to progress. As an alternative, the simulated interaction could be performed prior to executing the instruction and, upon return after restoring the architected state, execute the instruction again to result as expected and progress in the simulation from that point. Other examples of trigger conditions are possible.

The process can proceed based on recognizing the trigger condition for simulated interaction at a point in the test case, and change an architected state of the model. Changing the architected state directs the progression of the simulation, at the point in the test case, to simulate interaction between the processor core and another executing entity. In the case of a page table entry invalidation, the changing can alter storage of the model that corresponds to the act of invalidating the page table entry, which could be a store of a single byte with a single bit turned on or otherwise altered. More generally, the changed state can emulate any desired exception condition, for instance a protection exception like one based on a KeyStore or other shared storage.

In some examples, the state change is performed under a quiesce sequence issued by the simulation environment based on inclusion of the targeted command in the test case.

The quiesce may be part of shared resource rules for hardware, for instance, and thus be issued to the processor core being tested.

It is noted that the changed state can direct the progression of the simulation, at the point in the test case, to simulate interaction between the processor core and another executing entity, though the directed progression does not necessarily cause a redirection of the test case at the moment the change to the architected state is made. For instance, the change state (invalidated page table entry, as an example) could present an exception condition that is not raised until execution of the instruction that attempts to use the entry, as was identified as part of the test generation to build the targeted command to change the state, is executed to drive the exception.

Eventually, the simulation encounters an instruction that results in the targeted collision. In the case of an invalidated page table entry, the instruction is one that uses the page that is now invalid (by way of the changed architected state) and takes a page fault exception. Thus, attempting to execute the instruction causes an architected response, in this case a page fault exception.

At some point, there can be a restore to change the architected state again, for instance to change the architected state back to the initial state that existed prior to the original change. In the context of an exception, the change can be to remove the exception condition.

Any kind of exception handler can also be provided, either in the test case or built-into the simulation environment, for instance a driver thereof, if desired. In one particular example, a program interrupt handler (PIH) is provided that runs as a loop until the architected state is changed back to its initial state as it is expected to be in the test case. For instance, the program interrupt handler could check an interrupt code and adjust so that it always returns to the instruction that raised the exception. Provision of the handler can be important in situations where such exception was not accounted-for in the test case and so no appropriate exception handling is provided to deal with the situation. Normally such a handler may not be provided in the test if the test is not expected to result in such an exception.

Based on a determination to end the simulated interaction, for instance a determination that the exception condition could be removed, the process can continue progression of the simulation from the point in the test case as which the simulated interaction began. In the case of a page exception, based on a trigger it might be determined to change back the architected state by restoring the entry. By operation of the example exception handler, the simulation environment, for instance the driver thereof, issues the command(s) for a quiesce and restores a 'page valid' indication. More generally, the process can undo the change it previously made to the architected state, or otherwise change the architected state to 'undo' the prior and remove the changed condition.

In the example where there are state change and state restore conditions for satisfaction, the architected state can remain in the changed state for the simulated interaction, and the process can further monitor the progression of the simulation for the state restore condition, then, based on recognizing the state restore condition, restore the architected state to the initial state. The simulation can proceed to complete the instruction/operation with no exceptions (as indicated by the test), and continue progressing through additional test instructions.

It may be desired for the test case to end with all of the results that were expected from the original test intact, i.e., as if the targeted commands and simulated interaction were not included in the test case and no such simulated interaction as described herein took place. In this regard, simulations progress instruction-by-instruction (IBI) as discussed above in which there is a lockstep progression of instruction execution followed by result collection by the simulation environment, followed by next instruction execution, and so on. Results collected from instruction execution may be compared to expected results (provided in the test case), and this may be done as the simulation progresses and/or after the instructions of the stream are executed. In some examples, bytes are tested/compared both immediately after instruction execution and at the end of the test. The nature of IBI result comparison and other test artifacts could show instructions, operations, and other artifacts that were not expected in the test case and therefore not reflected in the expected results placed into the test case during test generation. In some embodiments, it is desired to remove and/or mask such artifacts. Thus, an example process could perform a cleanup to cleanup one or more artifacts or any other traces of the simulated interaction. By way of specific example, there may be extra data placed into test results reflecting exception handler linkage, in which case this could be masked (or deleted) and thus ignored for end-of-test checking, for instance. Any other indications of an exception or other architected response being raised as a result of changing the architected state can be masked or removed. In other words, the test cleanup can be performed so that the test does not include indications of exceptions, artifacts, or other traces that the simulated interaction occurred.

The simulated interaction driven by providing the targeted command during test generation and the trigger condition(s) can be one simulated interaction of a plurality of simulated interactions done in a selected order. Thus, generating the test case can include in the test case a plurality of targeted commands in a selected order to change the architected state and drive the plurality of simulated interactions in the selected order. Selecting the order can by manual or automatic, and, in any case, can result in serial performance of the plurality of simulated interactions as part of the simulation. Thus, the process can impart multiple simulated interaction scenarios into a test case. In specific examples, a simulated interaction scenario may not start until a prior simulated interaction scenario has finished. This allows building of more complex stimuli of the simulation environment.

Thus, in accordance with aspects of embodiments described herein, a test generator generates a set of instructions to test. This includes an instruction to complete successfully with expected results of the test case. In examples, the instruction is an interruptible operation such as a neural network processing assist (NNPA) instruction that is expected to complete successfully with no page fault or key exceptions, as examples. The test generator or another component can identify a resource used in execution of the instruction and that is subject of shared interaction with another entity. For instance, it extracts a random page that is accessed in executing the instruction and a target for shared interaction. The test generator can print a targeted command, for instance a targeted driver command, such as a command for a driver for testing a nest accelerator, into the test for the simulation environment to use. In simulation, the simulation environment, for instance the driver, waits for the given condition(s), issues a quiesce to a core interface as if from another core, and waits for a quiesce acknowledgement. The driver can issue a store as if from another core that invalidates a page and can issue a command to purge an entry in the appropriate translation lookaside buffer, then release the quiesce. The simulation can proceed. When the targeted instruction/operation executes, a page fault interrupt/exception (in this case) is raised, also referred to as 'thrown'. A special interrupt handler can return to the original instruction for retry. This can loop until the page invalid condition is no longer present. Certain condition(s) can be used to dictate the length of the simulated interaction, in this case, the invalid page table entry. For instance, the condition might be for the handler to run a specific number of times (3 times as one example). Once the condition(s) are satisfied to end the simulated interaction, the driver can repeat the quiesce store process, restore the page table entry valid bit, then release the quiesce. Simulation proceeds with the operation completing as if there were no exceptions. Meanwhile, test checking, for instance end-of-test checking, verifies the results. In examples, an alteration is made to the end-of-test checking to mask interrupt handler linkage bytes, for instance the bytes indicating that there was interrupt handling occurring during the testing.

A specific example for simulated interaction as provided herein is Invalidate Page Table Entry (IPTE) emulation to emulate page table entry invalidation from another core. Various targeted commands may be available for use with aspects described herein to target a variety of scenarios, examples of which include:

- Random Fetch (a cache line address with a random transfer invalidate type);
- Fetch Read Only (a cache line address with transfer invalidate for read);
- Fetch Exclusive (a cache line address with fetch exclusive, hold, then release);
- Store/Restore (alteration of data, with conditional restore of value);
- Compare Store/Restore (monitoring for a value in memory, and when observed, store a new value, with conditional restore of old value);
- Quiesce Store/Restore (the Compare Store/Restore but performed during a system quiesce to emulate legal true storage synchronization); and
- Key Store/Restore (the Quiesce Store/Restore operating on a storage key rather than other data values).

As noted above, the targeted commands can be triggered based on any desired trigger conditions, for instance at specific simulation times, randomly within a range of simulation times, or upon completion of an instruction at a certain address, as examples. The example of monitoring for a value in memory, and when observed, storing a new value can be triggered on a memory value being observed at a certain location, for instance. In addition, as noted, interaction scenarios can be ordered within the test case to ensure that particular scenarios are complete before others start. Scenarios that are intended to cause a program exception can also install a special program interrupt handler for exception handling, for instance one that returns to the instruction that observed the exception. In situations of emulated concurrent modification of the instruction stream (CMODX), an example of which is provided below, a special subroutine can be installed without being a built-in feature of the simulation environment. Additionally, addresses to access can have masks to target a range, for example an entire millicode instruction address range, as one example. In some embodiments, the data can have masks so that bits can be altered, for instance in emulation of page table entry invalidation.

Figure 2:
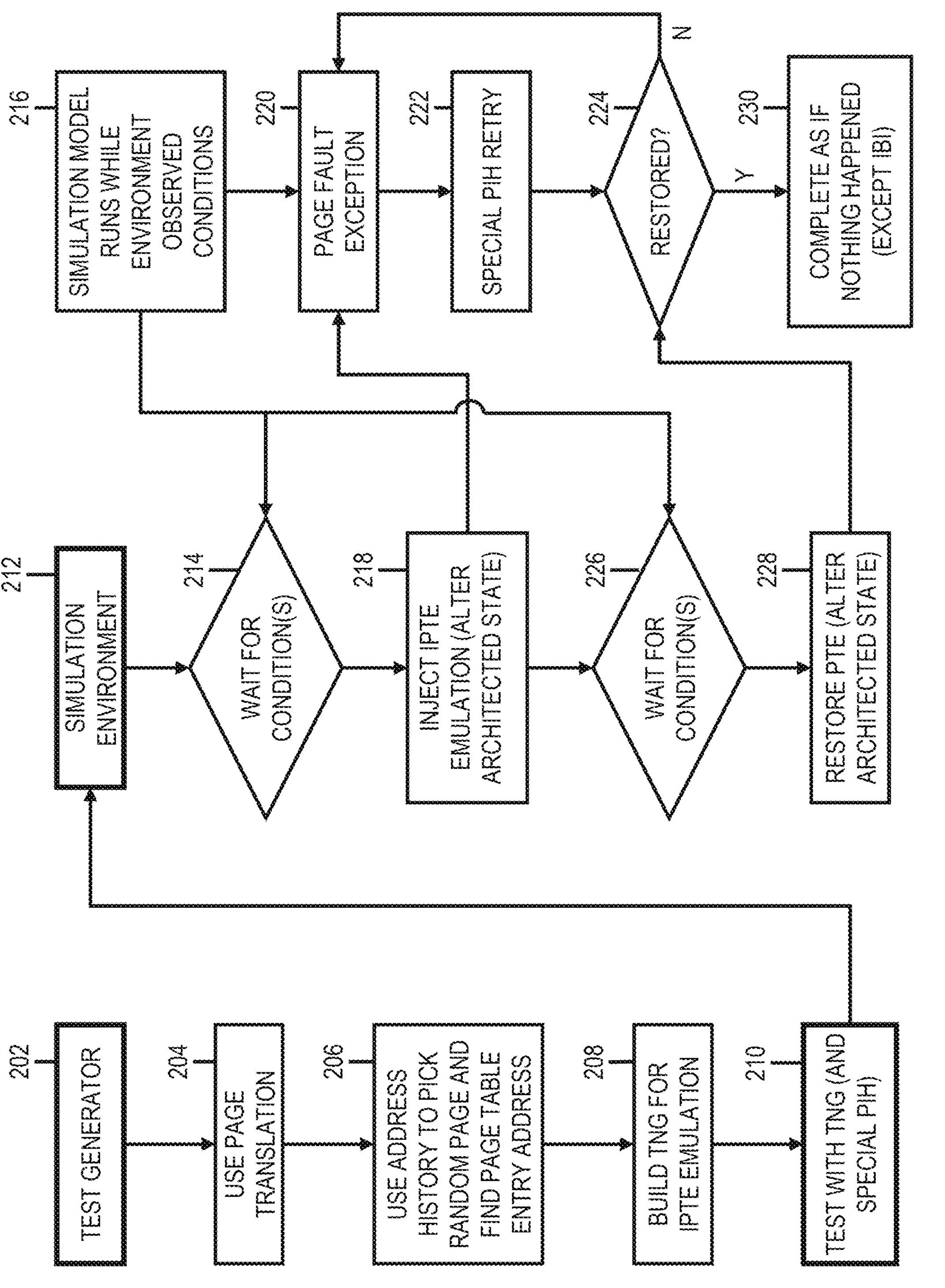
FIG. 2 depicts an example of targeted command generation and simulated page invalidation interaction in functional verification of a processor core, in accordance with aspects described herein.

FIG. 2 depicts a specific example of targeted command generation and simulated page invalidation interaction in functional verification of a processor core, in accordance with aspects described herein. The process adds targeted command(s) to the test to guide the simulation environment as described. The process can be performed by a computer system, for instance one performing functional verification. In examples, the process is implemented by functional verification code, e.g., code 150 of FIG. 1.

In this example an invalidate page table entry (IPTE) interaction is emulated. Based on the specific trigger condition(s), the entry invalidation can effectively invalidate that particular page at a particular time. This action can target a particular test case instruction that would execute, attempt to reference the page, and raise an exception to, e.g., a special program interrupt handler. Referring to FIG. 2, a test generator (202) is invoked to generate a test case for verification of a processor core. The test generator generates instructions for the test case, and the process at 204 identifies a generated instruction for which the execution uses a page translation. This may be identified as a point in the test case at which to emulate a page invalidation, for instance an invalidation by another entity, such as another processor core. The process uses (206) an address access history to select a random page and page table entry address to be the target of the invalidation, and then builds (208) a targeted command, for instance a targeted nest generator (TNG) command for page table entry invalidation emulation. This TNG is printed to/included within the test case to change the architected state to emulate the page invalidation by altering the at least one bit value in storage, and based on a certain state change trigger condition. Indications of a state change condition and a state restore condition can therefore also be included in the test case. The result 210 is a test case with the targeted command and possibly other information, such as trigger conditions. In this example, it also includes a special program interrupt handler to handle the interrupt that is expected when executing the test case instructions after invalidating the page table entry during simulation. The example program interrupt handler may be installed to iteratively retry execution of the instruction of the test case, based on the page table entry being invalidated. In this manner, the test generator generates an instruction that uses a shared resource (storage in this example) and. instead of generating instructions on another thread to interact with the instruction, includes a targeted command to dictate that the simulation environment driver (e.g., nest driver in this example) generate stimuli directly related to that instruction.

The process continues at some point by running the test case in the simulation environment (212). Thus, the process commences a simulation in the simulation environment to execute the test case using a model of the processor core for functional verification thereof.

The process monitors progression of the simulation, waiting for a trigger condition (214) for simulated interaction. During this, the simulation model runs while the environment observed for the conditions (216). Based on recognizing the trigger condition for simulated interaction at a point in the test case, the process changes an architected state of the model. In this example, the process injects (218) IPTE emulation by altering the architected state of the model, for instance altering storage that corresponds to the act of invalidating the page table entry. In a particular example, this is done by storing of a single byte with a single bit set (e.g., turned on) to indicate invalidity. Again, this might be done under a quiesce to conform to applicable requirements.

The changing directs the progression of the simulation, at the point in the test case, to simulate interaction between the processor core and another executing entity. The changed state in this example emulates a page fault exception by altering at least one bit value of the model, which invalidates the page table entry and drives a page fault exception based on execution of the targeted instruction of the test case. Thus, the simulation encounters the instruction that uses the page table entry that is now invalid and takes a page fault exception (220). Processing progresses to the special program interrupt handler, in which case the handler adjusts (222) the interrupt code to return to the instruction that threw the exception. The process determines (224) whether the page table entry is restored, and, if not (224, N) loops back to 220 with another page fault exception. In some examples, the instruction is executed again without the restored page table entry and throws the page fault exception again. This can repeat for one or more iterations.

The process monitors progression of the simulation, waiting for a state restore trigger condition (226). In a specific example, the state restore condition in this example is that the special page interrupt handler has completed execution a set number of time, for example three times. Based on recognizing the state restore condition, the process restores the architected state to the initial state. Restoring the architected state to the initial state in this example includes restoring the at least one bit value to restore the page table entry (228). Based on a determination to end the simulated interaction, progression of the simulation can continue from the point in the test case where simulated interaction began. Thus, the determination to end the simulated interaction includes the determination 224 that the page table entry is restored (224, Y), at which point the simulation proceeds and eventually completes (230) as if no page table entry invalidation and subsequent exception(s) occurred. Any instruction-by-instruction artifacts that may exist can be cleaned (masked/deleted) to remove trace(s) of the simulated interaction.

Figure 3:
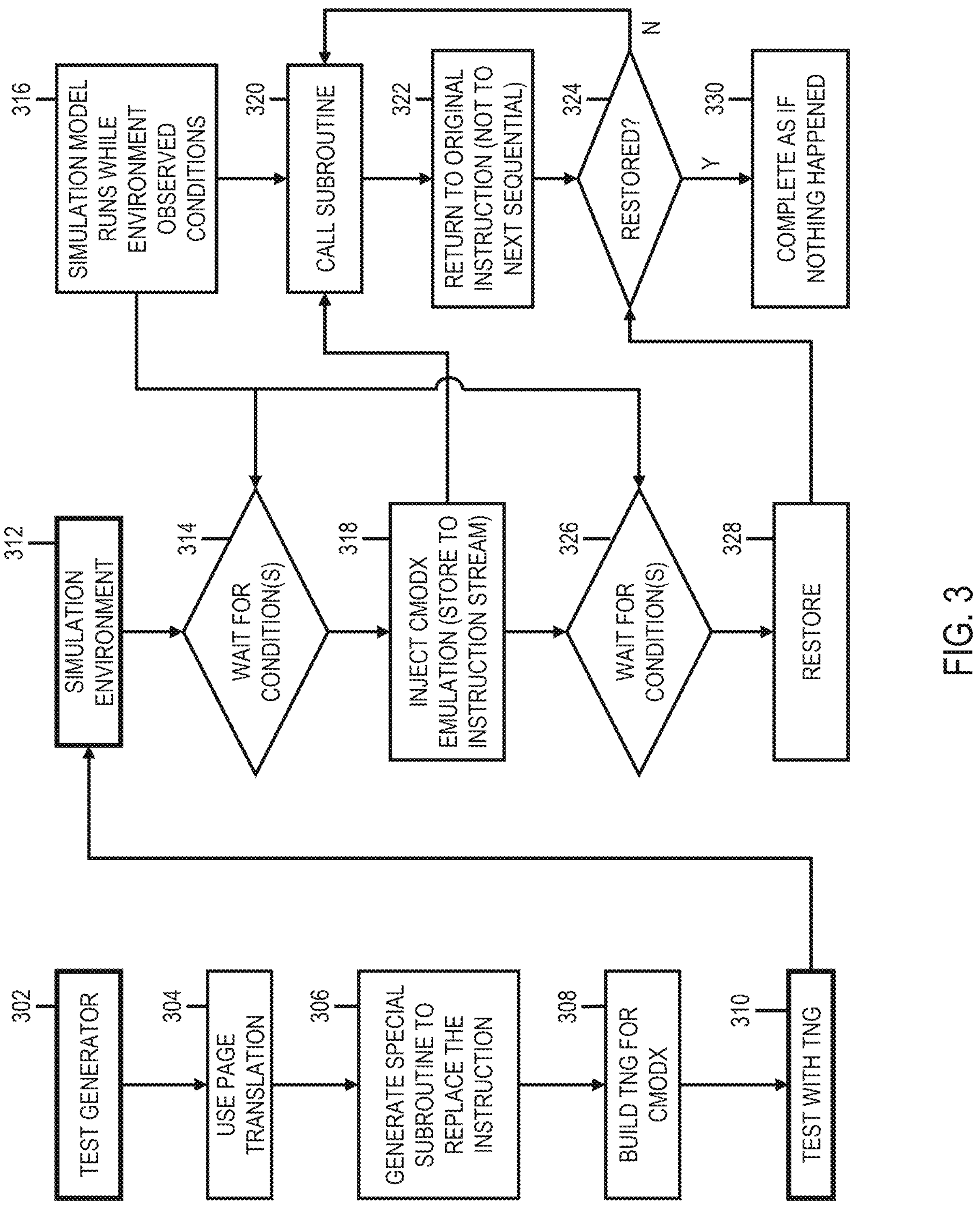
FIG. 3 depicts an example of targeted command generation and simulated instruction stream modification interaction in functional verification of a processor core, in accordance with aspects described herein.

FIG. 3 depicts an example of targeted command generation and simulated instruction stream modification interaction in functional verification of a processor core, in accordance with aspects described herein. The process adds targeted command(s) to the test to guide the simulation environment as described. The process can be performed by a computer system, for instance one performing functional verification. In examples, the process is implemented by functional verification code, e.g., code 150 of FIG. 1.

In this example, a concurrent modification of instruction stream (CMODX) interaction is emulated. Referring to FIG. 3, a test generator (302) is invoked to generate a test case for verification of a processor core. The test generator generates instructions for the test case, and the process at 304 identifies an instruction targeted for simulated modification. This may be identified as a point in the test case at which to emulate a modification to the instruction stream of the test case, for instance a modification by another entity, such as another processor core. The process also generates (306) a subroutine to replace the instruction identified, and then builds (308) a targeted command, for instance a targeted nest generator (TNG) command for CMODX emulation for inclusion in the test case. The TNG command can be a targeted command to change the architected state to emulate the modification to the instruction stream to call the subroutine, and based on a certain state change condition. Indications of a state change condition and a state restore condition can therefore also be included. The result 310 is a test case with the targeted command and in this example also a subroutine to replace the instruction targeted for CMODX. The subroutine could have any desired operation(s) performed as part thereof.

The process continues at some point by running the test case in the simulation environment (312). Thus, the process commences a simulation in the simulation environment to execute the test case using a model of the processor core for functional verification thereof.

The process monitors progression of the simulation, waiting for a trigger condition (314) for simulated interaction. During this, the simulation model runs while the environment observed for the conditions (316). Based on recognizing the trigger condition for simulated interaction at a point in the test case controlled by the trigger condition, the process changes an architected state of the model. In this example, the process injects (318) CMODX emulation by altering the architected state of the model, for instance replacing the instruction of the test case, at the point in the test case, with a changed instruction that directs the progression of the simulation to a subroutine.

The changing directs the progression of the simulation, at the point in the test case, to simulate the changing of the instruction stream. The changed state in this example emulates the CMODX. The simulation encounters the instruction directing progression of the simulation to the subroutine, for instance through a call (320) to the subroutine. The subroutine is called and, when concluded, the process returns (322) to the point of the original instruction (which has been replaced at this point). The process determines (324) whether the original instruction is restored, and, if not (324, N) loops back to 320 to call the subroutine. In some examples, the instruction (that replaced the original instruction) is executed again, which results in the calling of the subroutine. This can repeat for one or more iterations.

The process monitors progression of the simulation, waiting for a state restore trigger condition (326). Based on recognizing the state restore condition, the process restores the architected state to the initial state. Restoring the architected state to the initial state in this example includes restoring the instruction of the test case (328) that was replaced at 318. Based on a determination to end the simulated interaction, progression of the simulation can continue from the point in the test case where simulated interaction began. Thus, the determination to end the simulated interaction includes the determination 324 that the instruction of the test case is restored (324, Y), at which point the simulation proceeds and eventually completes (330) as if no instruction stream modification occurred. Any artifacts that may exist can be cleaned (masked/deleted) to remove trace(s) of the simulated interaction.

Figure 4:
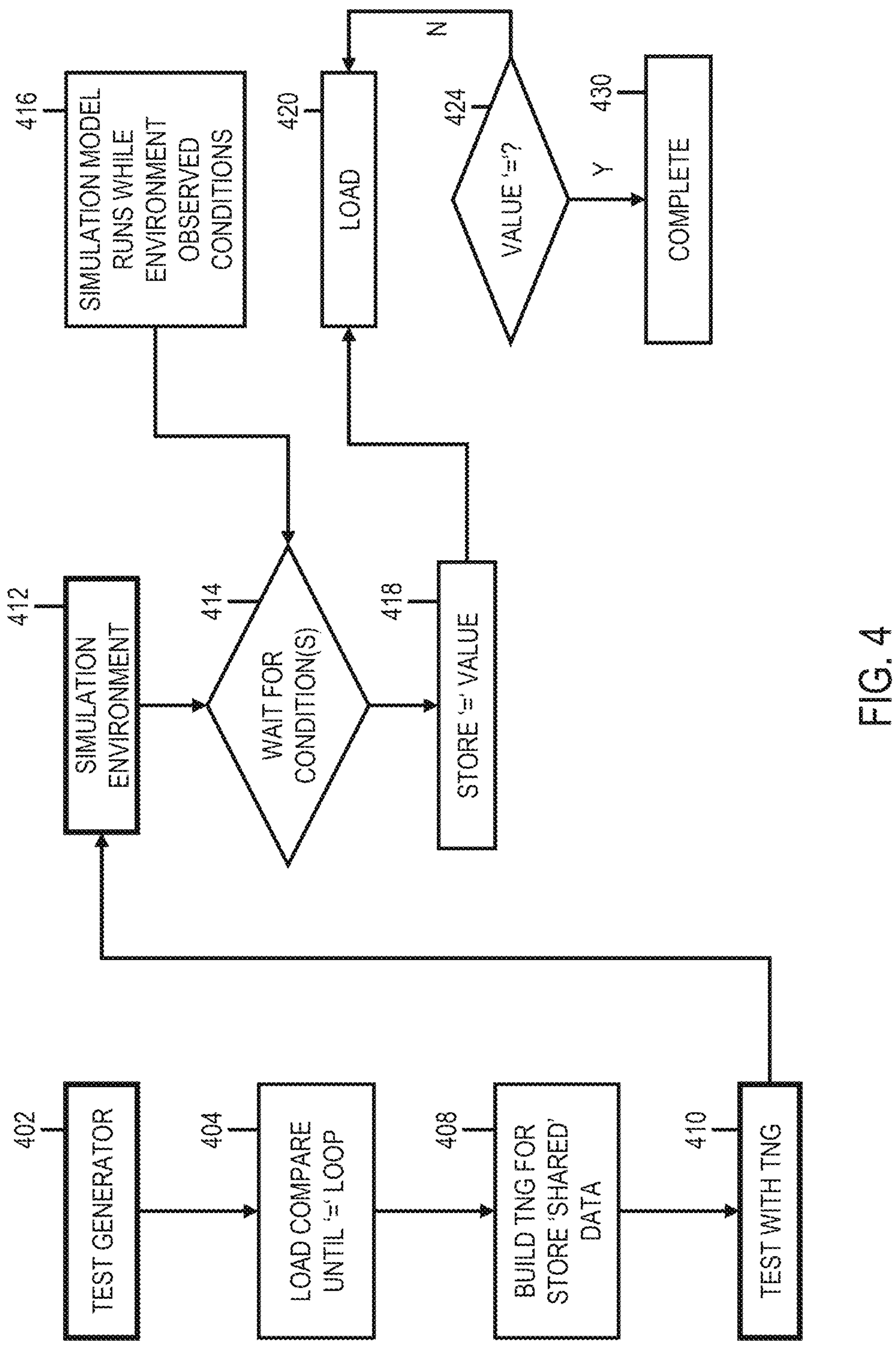
FIG. 4 depicts an example of targeted command generation and simulated data sharing interaction in functional verification of a processor core, in accordance with aspects described herein.

FIG. 4 depicts an example of targeted command generation and simulated data sharing interaction in functional verification of a processor core, in accordance with aspects described herein. The process adds targeted command(s) to the test to guide the simulation environment as described. The process can be performed by a computer system, for instance one performing functional verification. In examples, the process is implemented by functional verification code, e.g., code 150 of FIG. 1.

In this example, sharing of data by another entity, such as another processor core, is emulated. Referring to FIG. 4, a test generator (402) is invoked to generate a test case for verification of a processor core. The test generator generates instructions for the test case. The process at 404 loads a data value in a loop for a comparison for equality, i.e., a compare until '=' loop. This may be a loop that checks for equality between two values, for instance whether a store/restore of a value equal to a given other value has occurred, as an example.

The process also builds (408) a targeted command, for instance a targeted nest generator (TNG) command to store 'shared' data (for instance a value equal to the given value) for simulation of the sharing of the data from the other entity. The TNG command can be a targeted command to store that data based on a trigger condition. An indication of this trigger condition can therefore be included in the test case. The result 410 is a test case with the targeted command.

The process continues at some point by running the test case in the simulation environment (412). Thus, the process commences a simulation in the simulation environment to execute the test case using a model of the processor core for functional verification thereof.

The process monitors progression of the simulation, waiting for the trigger condition (414) for simulated interaction at a point in the test case. During this, the simulation model runs while the environment observed for the conditions (416). Based on recognizing the trigger condition for simulated interaction at the point in the test case controlled by the trigger condition, the process changes the architected state of the model so that the changed state directs progression of the simulation, at the point in the test cases, to simulate interaction between the processor core and another executing entity. In this example, the changed state emulates sharing of data by the another executing entity, and changing the architected state to the changed state includes storing a value to the model. The storing emulates an indication that the data has been shared (e.g., stored/restored) by the another executing entity and directs the progression of the simulation to proceed as if the data were shared to the processor core by another thread or processor core. Here, the process stores/restores the value equal to the other value (418) so that a check (424) whether the equal value has been stored is answered in the affirmative.

The simulation processes a load operation (420) as part of the instruction stream to load a value from a location where it is stored. This causes the process to determine (424) whether the loaded value is equal to the given other value. If not (424, N), the process returns to the load (420) to again load the value from the location. This can iterate one or more times. Eventually, at a point at which the trigger condition is satisfied, the equal value is stored to the location (e.g., at 418) and the looping equality determination 424 is answered in the affirmative (424, Y). The determination that the value has been stored/restored serves as a determination to end the simulated interaction, and progression of the simulation can continue from that point in the test case. Thus, the simulated interaction in this example is relatively short-lived, in which the point at which to simulate the interaction is the storage of the value and the load 420 and inquiry 424 indicates the end of the simulated interaction ones that the shared data has been provided. Thus progression of the test case can continue from this point and the simulation eventually completes (430).

In one or more embodiments, one or more advantages described herein may be provided, though such advantages are not necessarily required in any or all of the embodiments. For instance, aspects described herein can enable testing of shared storage interactions from other core(s) even when running a simulation model with only one core.

Aspects described herein can additionally or alternatively enable targeting of micro-architecture alterations (such as cache invalidate and hold) as if by another core to hit specific cache lines with very precise timing or random timing, as desired.

Aspects described herein can additionally or alternatively enable testing of interruptible operations by interrupting them with, e.g., a page fault, correcting the page fault, then resuming normal operation to a normal completion. This is more realistic of real hardware operation than other tests that might process to a page fault and fail to progress beyond the fault of the instruction. The interruptible operation testing or other simulated interaction processing as described herein may be provided as a built-in feature in the test generator.

Aspects described herein can additionally or alternatively enable running of additional simulation cycles since the simulation environment is leveraged for simulated interaction, instead of relying on the hardware model to simulate instructions.

Aspects described herein can additionally or alternatively enable controlled imposition of relatively long delays, for instance by holding a cache line and casting it back out multiple times if desired, rather than just one time after which testing progresses without further attention to the cache line.

Aspects described herein expand the coverage of core verification to allow verification of core-core interaction (including interaction between threads executing on different cores) that was conventionally unable to be done due to prohibitively high resource use. An example use case involves double performance of single threaded tests to verify shared scenarios versus old thread-thread scenarios. Both scenarios may be utilized as some logic may be the same, but some may be different. Moreover, aspects can greatly simplify the writing of tests of interruptible operations, for instance to test restarting after page faults and Key protection faults, as examples.

FIG. 5 depicts further details of example functional verification code (e.g., functional verification code 150 of FIG. 1) to incorporate and/or use aspects described herein. In one or more aspects, functional verification code 150 includes, in one example, various sub-modules to be used to perform functional verification, to include targeted command generation and simulated interaction as described herein for processor core functional verification. The sub-modules are, e.g., computer readable program code (e.g., instructions) in computer readable media, e.g., storage (persistent storage 113, cache 121, storage 124, other storage, as examples). The computer readable storage media may be part of one or more computer program products and the computer readable program code may be executed by and/or using one or more computing devices (e.g., one or more computers, such as computer(s) 101, computers of cloud 105/106, and/or other computers; one or more servers, such as remote server(s) 104 and/or other remote servers; one or more devices, such as end user device(s) 103 and/or other end user devices; one or more processors or nodes, such as processor(s) or node(s) of processor set 110 (e.g., processor 200) and/or other processor(s) or node(s); processing circuitry, such as processing circuitry 120 of processor set 110 and/or other processing circuitry; and/or other computing devices, etc.). Additional and/or other computers, servers, devices, processors, nodes, processing circuitry and/or computing devices may be used to execute one or more of the sub-modules and/or portions thereof. Many examples are possible.

Referring to FIG. 5, functional verification code 150 includes targeted command including sub-module 502 for including targeted command(s) in test a case for a simulation environment. Functional verification code 150 also includes simulation commencement/progression sub-module 504 for commencing/progressing a simulation in the simulation environment, the simulation executing the test case using a model of a processor core for functional verification of the processor core. Functional verification code 150 additionally includes simulation progression monitoring sub-module 506 for monitoring progression of the simulation for a trigger condition for simulated interaction. Functional verification code 150 further includes trigger condition recognition sub-module 508 for recognizing the trigger condition for simulated interaction at a point in the test case. Additionally, functional verification code 150 includes architected state changing sub-module 510 for changing an architected state of the model, where the changing directs the progression of the simulation, at the point in the test case, to simulate interaction between the processor core and another executing entity. Functional verification code 150 also includes simulation end determination sub-module 512 to determine whether to end the simulated interaction. Based on a determination to end the simulated interaction, the simulation commencement/progression sub-model 504 can continue progression of the simulation from the point in the test case.

In some embodiments, the trigger condition is a state change condition that triggers (by way of trigger condition recognition sub-module 508) the change in the architected state (by way of architected state changing sub-module 510) from an initial state to a changed state. Additionally, the progression of the simulation can be monitored (by way of simulation progression monitoring sub-module 506) for a state restore condition that triggers (by way of trigger condition recognition sub-module 508) restoring the architected state to the initial state by way of architected state changing sub-module 510.

Figure 6:
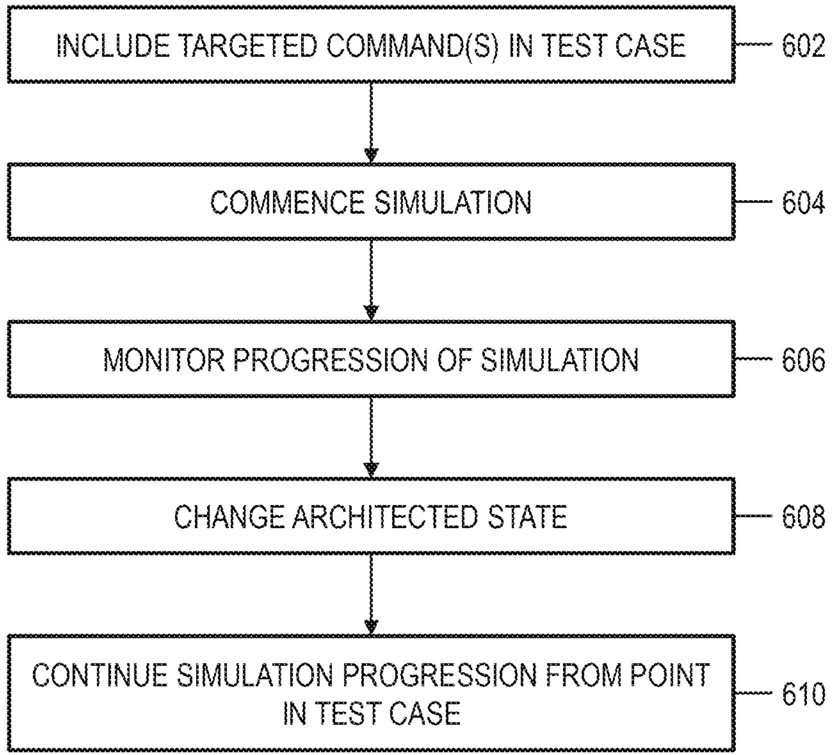
FIG. 6 depicts an example process for simulated interaction between processor hardware as part of processor functional verification, in accordance with aspects described herein.

FIG. 6 depicts an example process for simulated interaction between processor hardware as part of processor functional verification, in accordance with aspects described herein. The process may be executed, in one or more examples, by a processor or processing circuitry of one or more computers/computer systems, such as those described herein, and more specifically those described with reference to FIG. 1. In one example, code or instructions implementing the process(es) of FIG. 6 are part of code, such as code 150. In other examples, the code may be included in one or more modules and/or in one or more sub-modules of the one or more modules. Various options are available.

The process of FIG. 6 includes (602) targeted command (s) in a test case for a simulation environment. The process also commences (604) a simulation in the simulation environment, the simulation executing the test case using a model of a processor core for functional verification of the processor core. The process proceeds with monitoring (606) progression of the simulation for a trigger condition for simulated interaction, and, based on recognizing the trigger condition for simulated interaction at a point in the test case, changing (608) an architected state of the model. The changing directs the progression of the simulation, at the point in the test case, to simulate interaction between the processor core and another executing entity. In examples, changing the architected state performs the change under a quiesce sequence issued by the simulation environment based on inclusion of a targeted command in the test case.

Continuing with FIG. 6, based on a determination to end the simulated interaction, the process continues progression (610) of the simulation from the point in the test case.

In some embodiments, the trigger condition includes a state change condition that triggers the change in the architected state from an initial state to a changed state. The architected state can remain in the changed state for the simulated interaction. Additionally, the method can further include monitoring the progression of the simulation for a state restore condition, and, based on recognizing the state restore condition, restore the architected state to the initial state.

In a specific example embodiment described herein, the changed state emulates a page fault exception and changing the architected state to the changed state includes altering at least one bit value of the model. The altering can invalidate a page table entry and drive the page fault exception based on execution of an instruction of the test case, for instance an instruction for which execution thereof uses the page table entry. The restoring of the architected state to the initial state can include restoring the at least one bit value, where that restoring of the at least one bit value restores the page table entry. The determination to end the simulated interaction in this example can include a determination that the page table entry is restored.

In embodiments such as the above example, the method can further include, for example as part of test generation to generate the test case, identifying the point in the test case, the point being a point at which to emulate a page invalidation and including in the test case a targeted command to change the architected state to emulate the page invalidation by altering the at least one bit value, and indications of the state change condition and state restore condition. The commencing of the simulation can commence the simulation using the test case with the included targeted command and the indications of the state change condition and the state restore condition. Additionally, in embodiments, the method further includes in the test case a program interrupt handler to iteratively retry execution of the instruction of the test case, based on the page table entry being invalidated.

In another specific example embodiment described herein, the changed architecture state emulates a changed instruction stream of the test case, and changing the architected state to the changed state includes replacing an instruction of the test case, at the point in the test case, with a changed instruction that directs the progression of the simulation to a subroutine. Restoring the architected state to the initial state in this situation can include restoring the instruction of the test case, and the determination to end the simulated interaction can include a determination that the instruction of the test case is restored.

In embodiments such as the above example, the method can further include, for example as part of test generation to generate the test case, identifying the point in the test case, the point being a point at which to emulate a modification to the instruction stream of the test case, and including in the test case a targeted command to change the architected state to emulate the modification to the instruction stream to call the subroutine, and indications of the state change condition and state restore condition. The commencing of the simulation can commence the simulation using the test case with the included targeted command and the indications of the state change condition and the state restore condition.

In another specific example embodiment described herein, the changed state emulates sharing of data by the another executing entity, and changing the architected state to the changed state includes storing a value to the model. The storing can emulate an indication that the data has been shared by the another executing entity and direct the progression of the simulation to proceed as if the data were shared by another thread or processor core. The determination to end the simulated interaction can in this example include a determination that the value has been stored (or restored).

Optionally, the process of FIG. 6 can perform a cleanup to cleanup one or more traces of the simulated interaction.

In addition or alternatively, the simulated interaction may be one simulated interaction of a plurality of simulated interactions, and the method can further include generating the test case. The generating of the test case can incorporate including in the test case a plurality of targeted commands in a selected order to change the architected state and drive the plurality of simulated interactions in the selected order. The selected order can thus result in serial performance of the plurality of simulated interactions as part of the simulation performed.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

commencing a simulation in a simulation environment, the simulation executing a test case using a model of a processor core for functional verification of the processor core, wherein the test case includes (i) a targeted command, performance of which is triggered based on occurrence of a trigger condition that occurs during the simulation, for simulating interaction between the processor core and another processor core to change an architected state of the model from an initial state to a changed state and (ii) indications of a state change condition, to trigger the change in the architected state of the model according to timing predefined in the test case, and a state restore condition, and wherein the commencing the simulation commences the simulation using the test case with the included targeted command and the indications of the state change condition and the state restore condition;

monitoring progression of the simulation, with the architected state of the model in the initial state, for a trigger condition for simulated interaction;

based on recognizing the trigger condition for simulated interaction at a point in the test case, changing the architected state of the model from the initial state to the changed state, wherein the changing directs the progression of the simulation, at the point in the test case, to simulate the interaction; and based on a determination to end the simulated interaction, continuing progression of the simulation from the point in the test case.

2. The method of claim 1, wherein the trigger condition for simulated interaction comprises the state change condition, wherein the architected state remains in the changed state for the simulated interaction, and wherein the method further comprises: monitoring the progression of the simulation for the state restore condition; and based on recognizing the state restore condition, restoring the architected state to the initial state.

3. The method of claim 2, wherein the changed state emulates a page fault exception, wherein changing the architected state to the changed state comprises altering at least one bit value of the model, the altering invalidating a page table entry and driving the page fault exception based on execution of an instruction of the test case.

4. The method of claim 3, wherein the restoring the architected state to the initial state comprises restoring the at least one bit value, the restoring the at least one bit value restoring the page table entry, and wherein the determination to end the simulated interaction comprises a determination that the page table entry is restored.

5. The method of claim 4, wherein the method further comprises:

identifying the point in the test case, the point being a point at which to emulate a page invalidation, wherein the targeted command changes the architected state to emulate the page invalidation by altering the at least one bit value.

6. The method of claim 5, further comprising including in the test case a program interrupt handler to iteratively retry execution of the instruction of the test case, based on the page table entry being invalidated.

7. The method of claim 2, wherein the changed architecture state emulates a changed instruction stream of the test case, wherein changing the architected state to the changed state comprises replacing an instruction of the test case, at the point in the test case, with a changed instruction that directs the progression of the simulation to a subroutine.

8. The method of claim 7, wherein the restoring the architected state to the initial state comprises restoring the instruction of the test case, and wherein the determination to end the simulated interaction comprises a determination that the instruction of the test case is restored.

9. The method of claim 8, wherein the method further comprises:

identifying the point in the test case, the point being a point at which to emulate a modification to the instruction stream of the test case, wherein the targeted command changes the architected state to emulate the modification to the instruction stream to call the subroutine.

10. The method of claim 1, wherein the changed state emulates sharing of data by the other processor core, wherein changing the architected state to the changed state comprises storing a value to the model, wherein the storing emulates an indication that the data has been shared by the other processor core and directs the progression of the simulation to proceed as if the data were shared by the other processor core.

11. The method of claim 10, wherein the determination to end the simulated interaction comprises a determination that the value has been restored.

12. The method of claim 1, wherein the changing the architected state performs the change under a quiesce sequence issued by the simulation environment based on inclusion of the targeted command in the test case.

13. The method of claim 1, wherein the simulated interaction is one simulated interaction of a plurality of simulated interactions, wherein the method further comprises generating the test case, the generating comprising including in the test case a plurality of targeted commands in a selected order to change the architected state and drive the plurality of simulated interactions in the selected order, the selected order resulting in serial performance of the plurality of simulated interactions as part of the simulation.

14. The method of claim 1, wherein the another processor core is not modeled as part of the simulation.

15. A computer system comprising:

at least one computing device;

a set of one or more computer readable storage media; and program instructions, collectively stored in the set of one or more computer readable storage media, for causing the at least one computing device to perform computer operations including:

commencing a simulation in a simulation environment, the simulation executing a test case using a model of a processor core for functional verification of the processor core, wherein the test case includes (i) a targeted command, performance of which is triggered based on a trigger condition that occurs during the simulation, for simulating interaction between the processor core and another processor core to change an architected state of the model from an initial state to a changed state and (ii) indications of a state change condition, to trigger the change in the architected state of the model according to timing predefined in the test case, and a state restore condition, and wherein the commencing the simulation commences the simulation using the test case with the included targeted command and the indications of the state change condition and the state restore condition;

monitoring progression of the simulation, with the architected state of the model in the initial state, for a trigger condition for simulated interaction;

based on recognizing the trigger condition for simulated interaction at a point in the test case, changing the architected state of the model from the initial state to the changed state, wherein the changing directs the progression of the simulation, at the point in the test case, to simulate the interaction; and based on a determination to end the simulated interaction, continuing progression of the simulation from the point in the test case.

16. The computer system of claim 15, wherein the trigger condition for simulated interaction comprises the state change condition, wherein the architected state remains in the changed state for the simulated interaction, and wherein the computer operations further include: monitoring the progression of the simulation for the state restore condition; and based on recognizing the state restore condition, restoring the architected state to the initial state.

17. The computer system of claim 16, wherein the changed state emulates a page fault exception, wherein changing the architected state to the changed state comprises altering at least one bit value of the model, the altering invalidating a page table entry and driving the page fault exception based on execution of an instruction of the test case, wherein the restoring the architected state to the initial state comprises restoring the at least one bit value, the restoring the at least one bit value restoring the page table entry, wherein the determination to end the simulated interaction comprises a determination that the page table entry is restored, and wherein the computer operations further include:

identifying the point in the test case, the point being a point at which to emulate a page invalidation, wherein the targeted command changes the architected state to emulate the page invalidation by altering the at least one bit value; and including in the test case a program interrupt handler to iteratively retry execution of the instruction of the test case, based on the page table entry being invalidated.

18. A computer program product comprising:

a set of one or more computer readable storage media; and program instructions, collectively stored in the set of one or more computer readable storage media, for causing at least one computing device to perform computer operations including:

commencing a simulation in a simulation environment, the simulation executing a test case using a model of a processor core for functional verification of the processor core, wherein the test case includes (i) a targeted command, performance of which is triggered based on a trigger condition that occurs during the simulation, for simulating interaction between the processor core and another processor core to change an architected state of the model from an initial state to a changed state and (ii) indications of a state change condition, to trigger the change in the architected state of the model according to timing predefined in the test case, and a state restore condition, and wherein the commencing the simulation commences the simulation using the test case with the included targeted command and the indications of the state change condition and the state restore condition;

monitoring progression of the simulation, with the architected state of the model in the initial state, for a trigger condition for simulated interaction;

based on recognizing the trigger condition for simulated interaction at a point in the test case, changing the architected state of the model from the initial state to the changed state, wherein the changing directs the progression of the simulation, at the point in the test case, to simulate the interaction; and based on a determination to end the simulated interaction, continuing progression of the simulation from the point in the test case.

19. The computer program product of claim 18, wherein the trigger condition for simulated interaction comprises the state change condition, wherein the architected state remains in the changed state for the simulated interaction, and wherein the computer operations further include: monitoring the progression of the simulation for the state restore condition; and based on recognizing the state restore condition, restoring the architected state to the initial state.

20. The computer program product of claim 19, wherein the changed state emulates a page fault exception, wherein changing the architected state to the changed state comprises altering at least one bit value of the model, the altering invalidating a page table entry and driving the page fault exception based on execution of an instruction of the test case, wherein the restoring the architected state to the initial state comprises restoring the at least one bit value, the restoring the at least one bit value restoring the page table entry, wherein the determination to end the simulated interaction comprises a determination that the page table entry is restored, and wherein the computer operations further include:

identifying the point in the test case, the point being a point at which to emulate a page invalidation, wherein the targeted command changes the architected state to emulate the page invalidation by altering the at least one bit value; and including in the test case a program interrupt handler to iteratively retry execution of the instruction of the test case, based on the page table entry being invalidated.

* * * * *